F. F. WEAR.
COFFEE CHAFF SEPARATOR.
APPLICATION FILED NOV. 30, 1910.
1,005,380.
Patented Oct. 10, 1911.
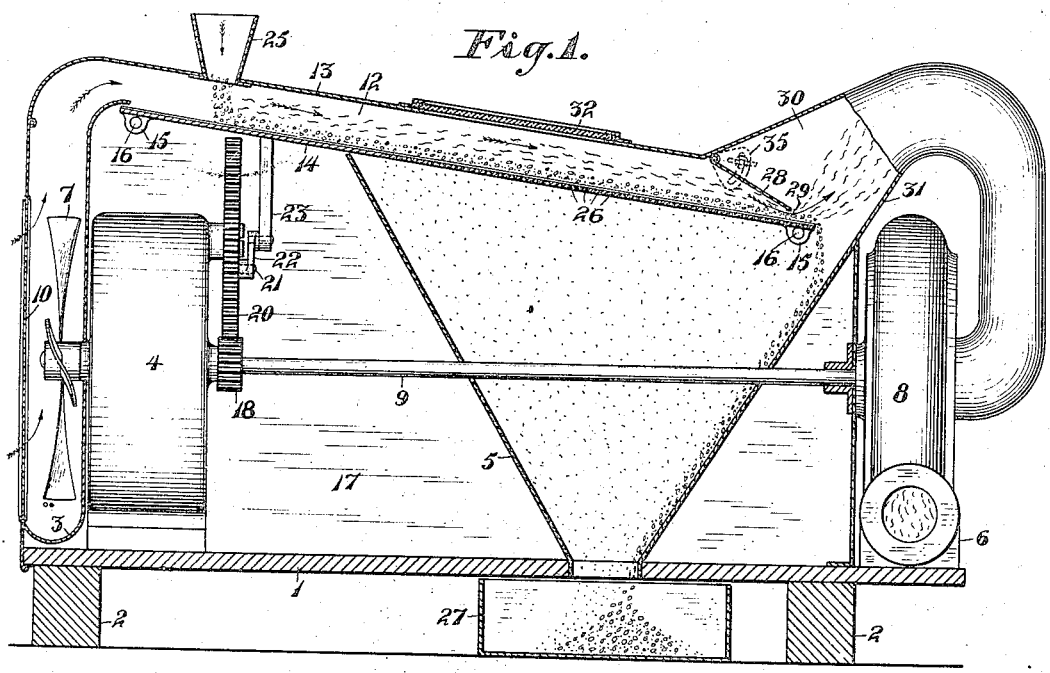
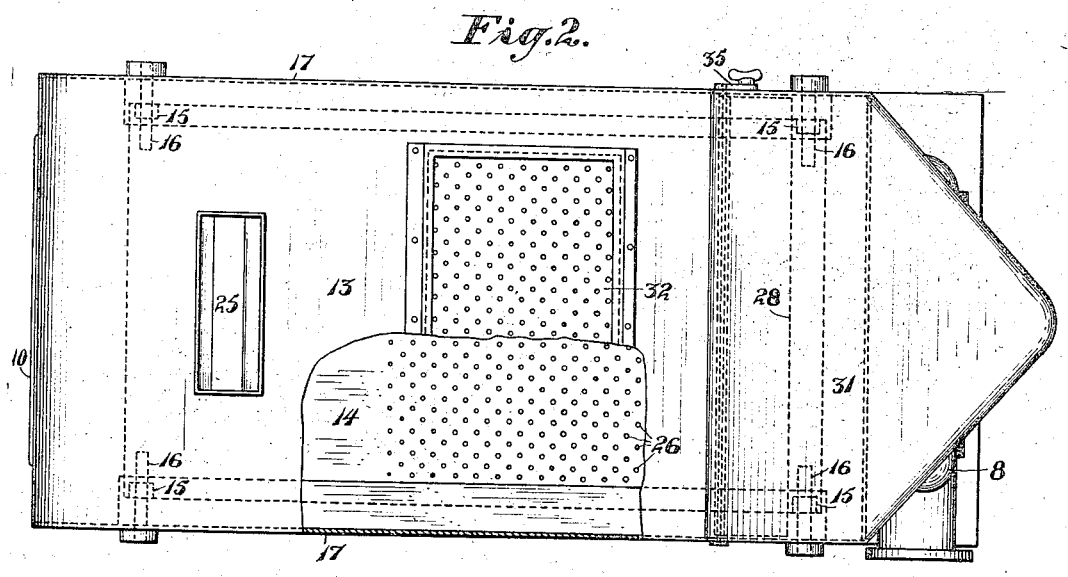
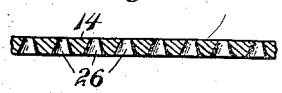
WITNESSES:
INVENTOR
F. F. Wear,
BY
F. M. Wright,
ATTORNEY

UNITED STATES PATENT OFFICE.

FRANK F. WEAR, OF SAN FRANCISCO, CALIFORNIA.

COFFEE-CHAFF SEPARATOR.

1,005,380.

Specification of Letters Patent.

Patented Oct. 10, 1911.

Application filed November 30, 1910. Serial No. 594,935.

*To all whom it may concern:*

Be it known that I, FRANK F. WEAR, a citizen of the United States, residing at San Francisco, in the county of San Francisco and State of California, have invented new and useful Improvements in Coffee-Chaff Separators, of which the following is a specification.

The present invention relates to an improved coffee chaff separator, the object of the invention being to provide a device of this kind which will be simple in construction, compact in form and effective in operation.

In the accompanying drawings, Figure 1 is a vertical longitudinal section, certain parts being shown in front elevation; Fig. 2 is a broken plan view thereof; Fig. 3 is an enlarged detail sectional view showing the form of said perforations.

Referring to the drawing, 1 indicates a base resting on suitable supports 2. Supported on said base are, at one end a blower casing 3, a motor casing 4 adjacent to said pressure chamber, a hopper 5, and a suction fan casing 6 at the other end. In said casings 3 and 6 are respectively a blower 7 and a suction fan 8, both mounted upon the shaft 9 of the motor in said motor casing. The rear side 10 of the blower casing 3 is formed with openings through which air is admitted to the blower 7. The air impelled by said blower escapes at the top of said blower casing into a conduit 12 of which the upper side 13 forms the upper side of the apparatus, and the lower side 14 is movably supported by apertured ears 15, which can slide transversely of the chamber on stems 16 extending inwardly from the side walls 17 of the apparatus. Said bottom is caused to reciprocate transversely by means of a pinion 18 on the motor shaft 9, which meshes with a gear wheel 20 on a stud shaft extending from the motor casing, on which gear wheel is eccentrically mounted a pin 21 to which is loosely connected a link 22, pivotally connected to a hanger 23 depending rigidly from the movable lower side 14.

The ground coffee is deposited in a hopper 25 in the upper side 13 of the conduit and falls therefrom into said conduit, in which, being in small particles, the column of coffee depending from said hopper is broken by the blast of air from the pressure blower and is distributed through the conduit. The lower side 14 of the conduit slopes downward and extends partly over the hopper 5, and the part thus extending over said hopper is perforated, as shown at 26. On account of the downward slope of the side 14 and also of the pressure of the air from the blower, the coffee slowly descends over said lower side, this descent being assisted by the constant agitation imparted to said coffee by the transversely reciprocating movement of said lower side. As it descends, the small particles of the broken coffee fall through the small perforations 26 into the hopper 5, while the large particles pass over the end of said lower side and thus fall into the hopper. Said perforations 26 are downwardly flaring in order to avoid being clogged up with the particles of coffee. The bottom of the hopper communicates with a box or receptacle 27 for the coffee. The chaff is blown by the air pressure to the lower end of the conduit 12, and at said end is provided a gate 28 pivoted at its upper edge, its lower edge extending over the lower side of the conduit and forming a contracted outlet 29 for the chaff and for the large pieces of coffee which have not been able to fall through the small perforations. Said opening is adjusted by a suitable arm 35 on the outside of the apparatus. On emerging from said outlet, the material is subjected to suction by the suction fan 8 which communicates by a conduit 30 with a suction chamber 31 inclosing said outlet 29. The suction created by said fan is sufficient to raise the chaff and convey it into said conduit 30, while unable to raise the larger particles of coffee. The upper side of the conduit is provided with a window 32 through which the action of the apparatus can be observed so that the size of the outlet opening can be properly adjusted.

By the above construction I am enabled to separate from the chaff, not only the large particles, which are easily separated, but also the very fine particles of coffee. This I accomplish by first subjecting the whole of the mixture to agitation, both by the reciprocating movement of the lower side of the conduit and by the pressure of air from the pressure blower, while at the same time adjusting the size of the outlet 29 so that the current of air from the blower is not sufficiently strong to carry with the chaff the fine particles of coffee. By causing the whole of the material thus agitated to pass over the perforated lower side of the conduit, I first eliminate from the mixture the fine particles of coffee, so that the mixture which emerges from the outlet 29 no longer contains any particles of coffee which could be carried up with the chaff by the suction of the suction fan. Upon said mixture so emerging at said outlet, the chaff is easily separated from the larger particles, which fall into the hopper and are mixed with the remainder of the coffee which has previously passed through said perforations 26.

I claim:—

1. The combination of a conduit, the lower side of the conduit sloping downward and having perforations, means for supplying ground coffee to said conduit, a hopper into which said perforations discharge, means for agitating said lower side, a blower for blowing air into the upper end of said conduit, means for adjusting the outlet at the lower end of said conduit, said lower end discharging into said hopper, a suction chamber inclosing said outlet, a suction fan, and a conduit leading from said suction chamber to said suction fan, substantially as described.

2. The combination of a base, a blower casing mounted at one end of said base, a suction fan casing mounted at the other end, a motor casing mounted on said base, a motor therein, a hopper mounted on said base, a blower and a suction fan respectively in said casings, and mounted on the shaft of said motor, a conduit above said hopper having a downwardly sloping perforated lower side, said perforations discharging into said hopper, the upper end of said conduit being connected to said blower casing and the lower end communicating with said suction casing, said lower end also discharging into said hopper, means for adjusting the outlet at the lower end of said conduit, and means actuated by said motor for agitating the lower side of the conduit, substantially as described.

In testimony whereof I have hereunto set my hand in the presence of two subscribing witnesses.

FRANK F. WEAR.

Witnesses:
FRANCIS A. WRIGHT,
D. B. RICHARDS.